United States Patent [19]
Buckley et al.

[11] Patent Number: 5,950,772
[45] Date of Patent: Sep. 14, 1999

[54] BICYCLE BRAKE SYSTEM HAVING A FLEXIBLE DISK

[75] Inventors: James A. Buckley, Whitefish Bay; George H. Hinkens, Mequon; Korey Johnson, West Allis, all of Wis.

[73] Assignee: Hayes Brake, Inc., Mequon, Wis.

[21] Appl. No.: 08/920,495

[22] Filed: Aug. 29, 1997

[51] Int. Cl.$^6$ ..................................................... B62L 5/00
[52] U.S. Cl. ...................... 188/26; 188/18 A; 188/24.22; 188/218 XL; 188/344
[58] Field of Search ..................... 188/18 A, 26, 188/24.22, 24.12, 72.4, 218 XL, 344, 17

[56] References Cited

U.S. PATENT DOCUMENTS

| | | |
|---|---|---|
| 1,717,520 | 6/1929 | Reilly . |
| 2,310,976 | 2/1943 | Masteller . |
| 3,216,198 | 11/1965 | Brooks . |
| 3,435,924 | 4/1969 | Beuchle . |
| 3,621,945 | 11/1971 | Spry . |
| 4,093,043 | 6/1978 | Smith . |
| 4,913,267 | 4/1990 | Campbell et al. . |
| 5,038,895 | 8/1991 | Evans . |
| 5,193,833 | 3/1993 | Resinger .............................. 188/344 X |
| 5,358,078 | 10/1994 | Gajek et al. ............................ 188/72.4 |
| 5,390,771 | 2/1995 | Hinkens et al. ......................... 188/344 |
| 5,529,150 | 6/1996 | Buckley et al. . |
| 5,632,362 | 5/1997 | Leitner ............................... 188/18 A X |

FOREIGN PATENT DOCUMENTS

| | | |
|---|---|---|
| 86107830 | 6/1986 | European Pat. Off. . |
| 29707918U1 | 7/1997 | Germany . |
| 1 366 446 | 10/1972 | United Kingdom . |
| 7910129 | 3/1979 | United Kingdom . |
| 8020643 | 6/1980 | United Kingdom . |
| PCT/GB89/ 00189 | 2/1989 | WIPO . |

*Primary Examiner*—Peter M. Poon
*Attorney, Agent, or Firm*—Foley & Lardner

[57] ABSTRACT

A bicycle brake system includes a flexible brake disk, a fixed mount single acting caliper, fixed and moveable brake pads and a brake actuator. The caliper is mounted on the bicycle frame in a position to straddle the brake disk. The fixed brake pad is mounted on one side of the caliper, and the moveable brake pad is mounted on the other side of the caliper. The brake actuator is on the moveable brake pad side of the brake disk and is aligned with the flexible brake disk. Upon actuation of the brake actuator, the flexible brake disk is flexed into engagement with the fixed brake pad.

12 Claims, 10 Drawing Sheets

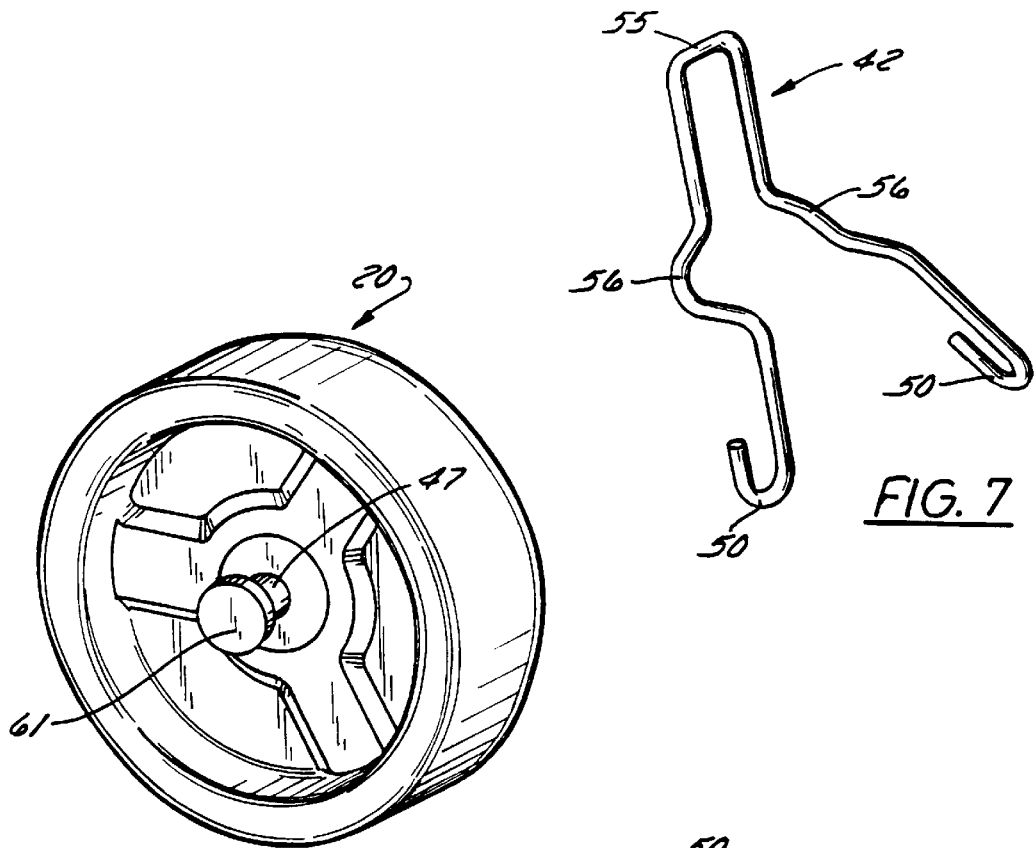
FIG. 7
FIG. 8
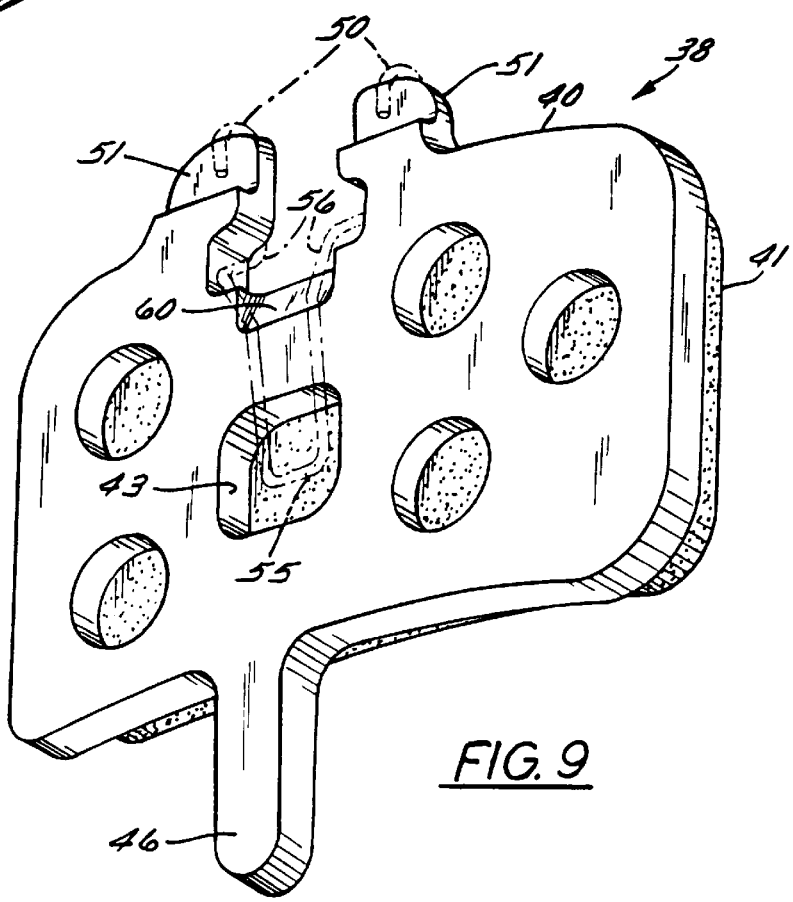
FIG. 9

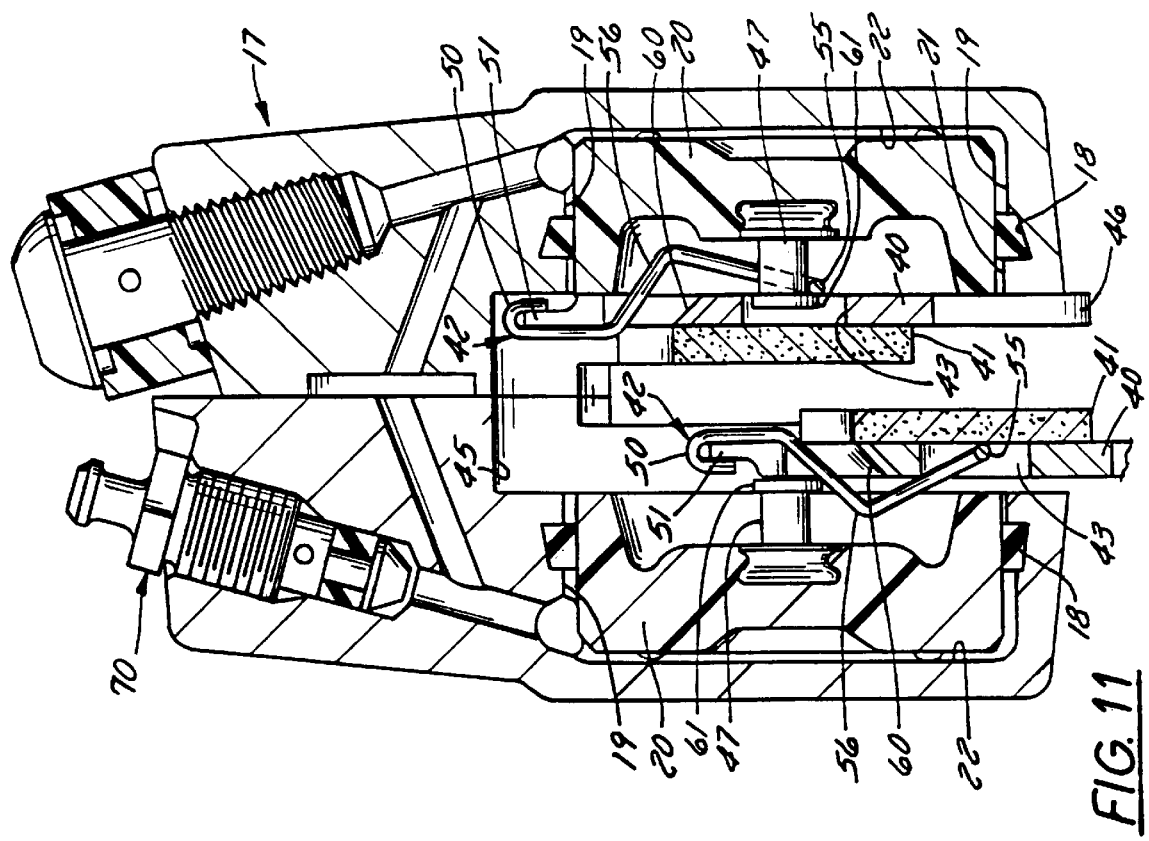
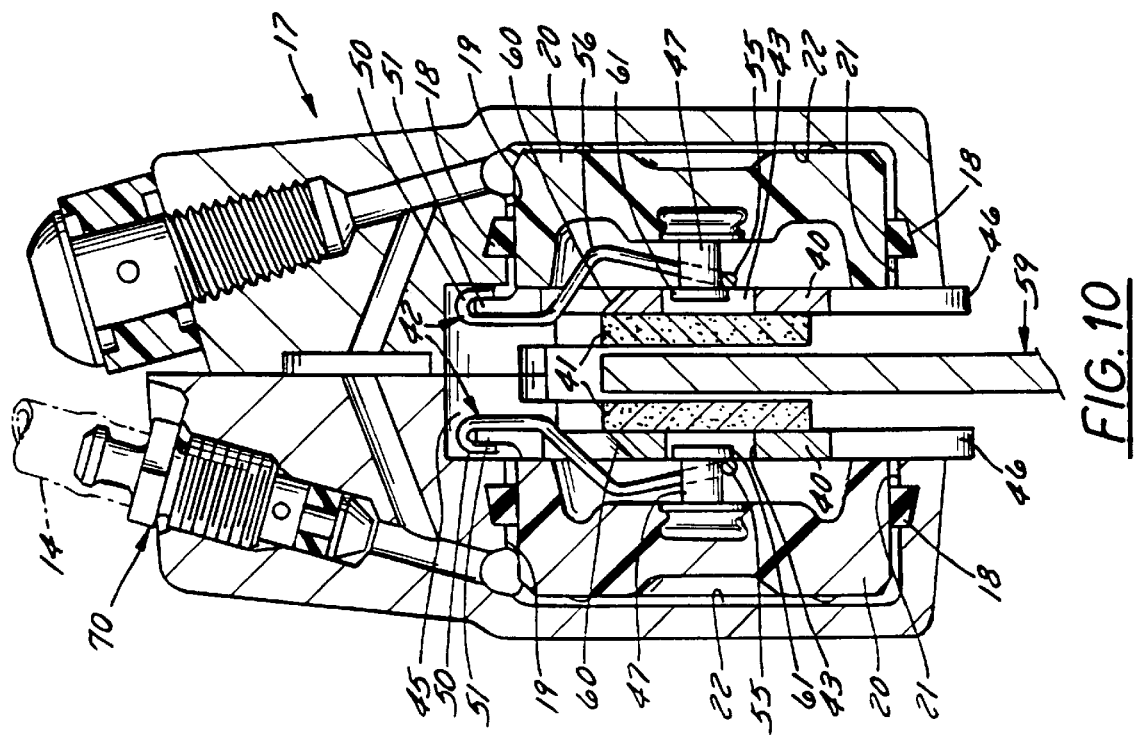

BICYCLE BRAKE SYSTEM HAVING A FLEXIBLE DISK

FIELD OF THE INVENTION

The present invention relates to a bicycle brake assembly, and more particularly to a closed bladder system which prevents the admission of air into the hydraulic brake system even though the bicycle is upside down.

BACKGROUND OF THE INVENTION

Bicycle brakes have evolved from hub brakes on rear wheels to machined cantilever brakes on front and rear wheel rims to disk brake systems. Many conventional disk brake system designs are not suited well to the bicycle, particularly since the bicycle will be operated by both children and adults, will be flipped upside down and laid on its side and made to be extremely light in weight. Current attempts at adapting motorcycle and automotive hydraulic disk brake technology to bicycles has fallen short due to this market's peculiar needs.

SUMMARY OF THE PRESENT INVENTION

The brake system described herein innovates a bleedable fluid reservoir with a bladder system that allows the atmospheric pressure reservoir to be drawn upon allowing the brake caliper piston to self adjust for pad wear without the potential of air ingestion and with room to expand the full volume in a high brake temperature condition. This system adapts a thermally compliant brake disk concept to an extremely lightweight embodiment for the bicycle industry yielding high torque carrying ability along with unparalleled thermal durability in a one piece design.

The system uses a ball joint piston design as shown in U.S. patent applications Ser. No. 08/638,526, entitled "Ball Joint Piston," and Ser. No. 29/044,276, entitled "Heavy Duty Brake Disc," to allow the smallest packaging for low weight and good wheel spoke clearance as well as eliminating the possibility of brake drag. This system demonstrates a user friendly lever adjustment to allow hand sizes from those of children to adults for comfort and safety. This lever adjustment avoids rattles and vibration effects with a rod back stop that reduces critical tolerances and whose piston and boot grip the mating push rod.

A unique post and piston assembly is coupled to a friction pad backing plate that uses a wire formed spring to secure the friction pad which both maximizes the disk to friction material clearance (eliminating any brake drag) while allowing an extremely easy pad change. This pad retention system also prevents the pads from falling out while transporting the bicycle with the wheel (and therefore the brake disk) out of the front fork. This system also prevents rattling noise by holding the friction pad backing plate tightly to the face of the brake piston.

Other principal features and advantages of the invention will become apparent to those skilled in the art upon review of the following drawings, the detailed description and the appended claims.

BRIEF DESCRIPTION OF THE DRAWINGS

FIG. 7 is a perspective view of the pad spring;

FIG. 8 is a perspective view of the piston;

FIG. 9 is a perspective view of the friction pad and plate assembly;

FIG. 10 is a cross-section view of the brake caliper assembly;

FIG. 11 is a view of the brake pad partially installed in the housing showing the deflection of the pad retention spring;

Figure 1:
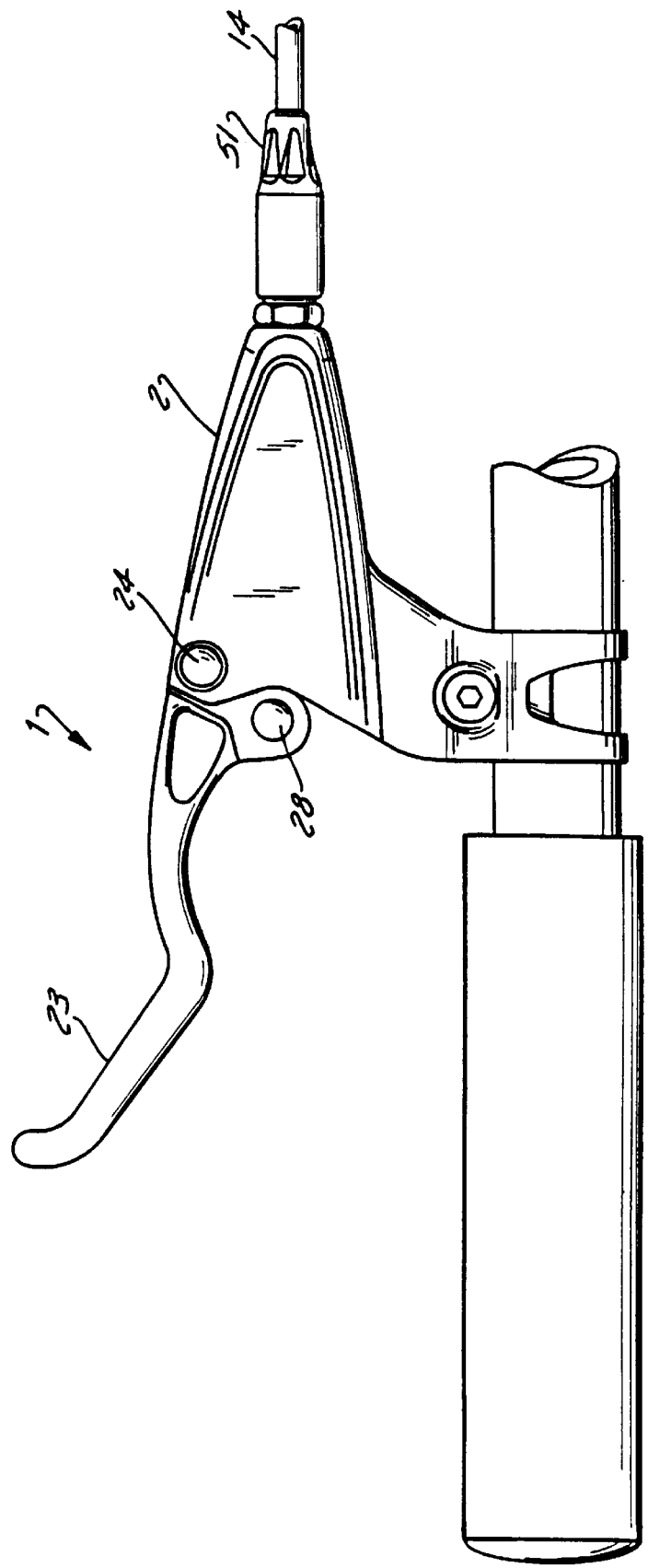
FIG. 1 is a side elevation view of the master cylinder shown mounted on the handlebar.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 2:
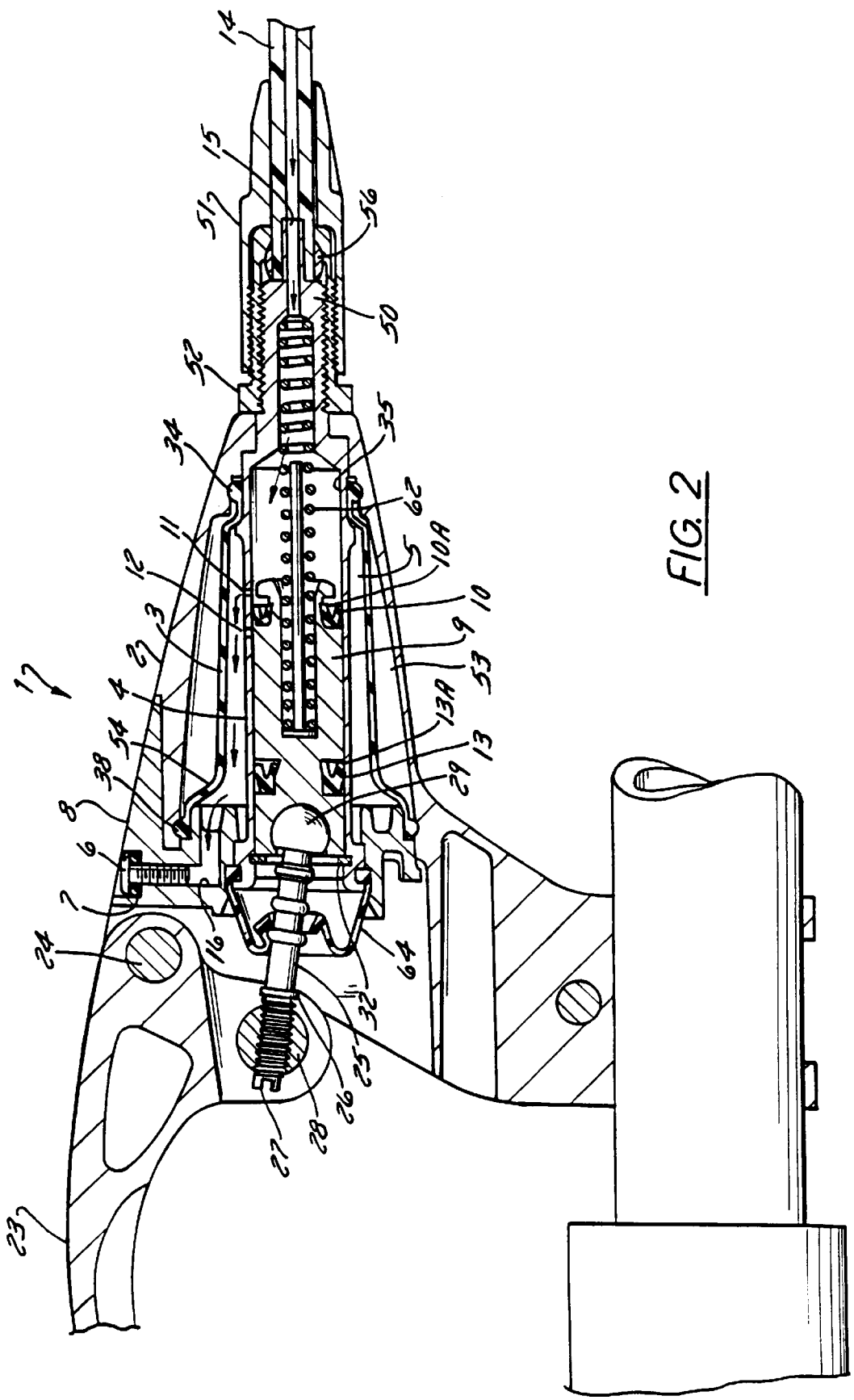
FIG. 2 is a cross-section view of FIG. 1 showing the adjustable push rod assembly (piston reservoir bladder, bleeder and compression fitting)
Figure 2B:
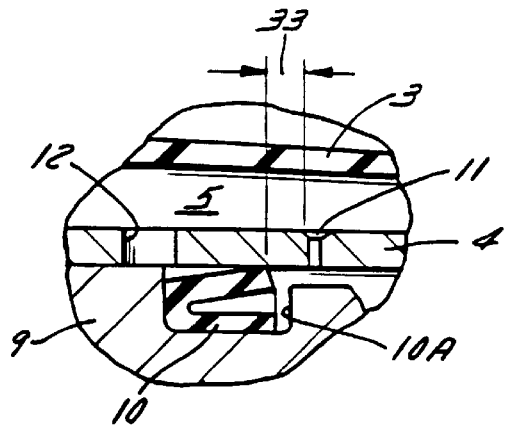
FIG. 2B is an enlarged view of the port timing opening and the fluid compensating openings.
Figure 3:
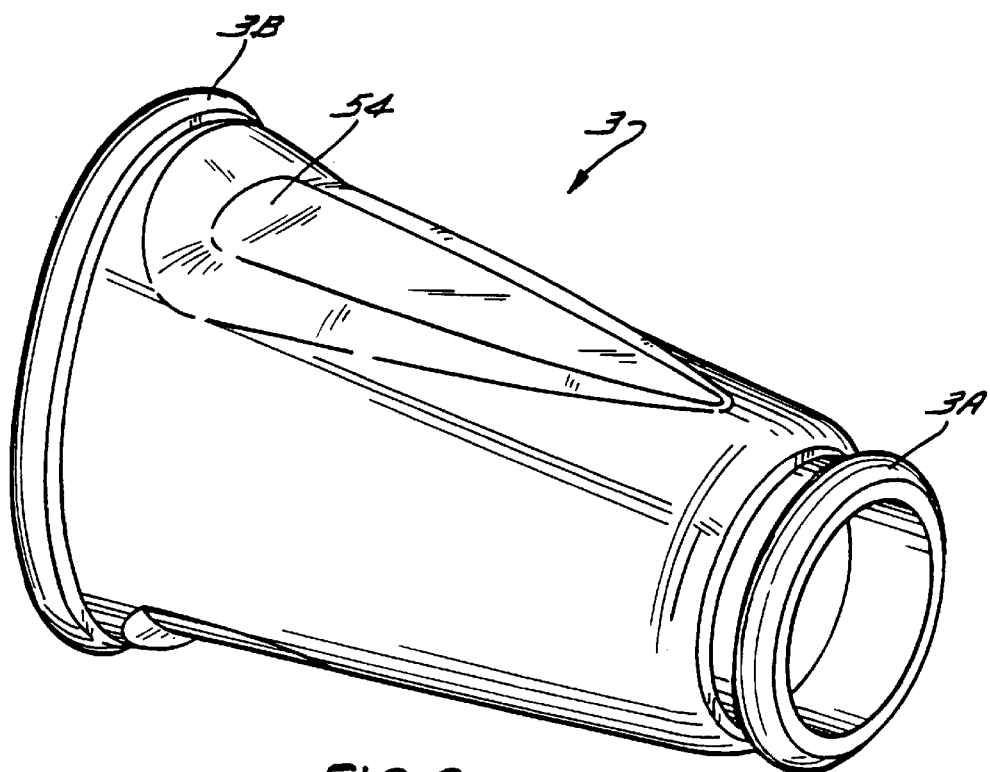
FIG. 3 is an external view of the reservoir bladder in its free state.

The master cylinder assembly 1 as shown in FIGS. 1 and 2 includes an outer housing 2 and an inner cylindrical body 4 mounted in the outer housing 2. A containment ring 8 is mounted on one end of the housing 2 for supporting one end of the cylindrical body. A rubber reservoir bladder 3 as shown in FIG. 3, has one end sealed to the inner end of the cylindrical housing 2 by a seal ring 3A and the other end secured to the containment ring 8 by the housing 2. An air space 53 is provided between the bladder 3 and the housing 2. The cylindrical body 4 is mounted in a spaced relation from the bladder 3 to form a fluid reservoir 5. A bleeder screw 6 is mounted in a threaded bleeder port or hole 16 in the containment ring 8 and sealed therein by an O-ring seal 7. A piston 9 is axially aligned in the cylindrical body 4 and retained therein by means of a snap ring 32. A spring 62 is aligned with the piston 9 to bias the piston to the open position in contact to the O-ring 32. A primary cup seal 10 is aligned in a groove 10A in the end of the piston 9. Referring to FIG. 2B a port timing hole 11 is provided in the cylinder 4 downstream from the cup seal 10. A fluid compensating hole 12 is provided in the cylindrical body 4 upstream from the groove 10A.

The cross-section of the housing 2 shown in FIG. 2 shows the state of the bladder 3 in a normal operating position. The bladder 3 is filled with fluid from the brake bleeder valve 70 as shown in FIG. 10 and is devoid of air. An air space 53 is provided outside the bladder 3 to allow for fluid expansion of the bladder that occurs during heavy braking as the fluid is heated. There is adequate reserve fluid volume within the bladder 3 to allow for brake piston adjustment outward to compensate for brake pad wear. The system is designed to provide an air space 53 between the bladder 3 and the housing 2. The fluid volume of the bladder 3 is determined by virtue of the shape of the bladder 3.

In this regard a perspective view of the bladder 3 is shown in FIG. 3 in its free state. The side walls of the bladder 3 are provided with indentations or dimples 54 which allow the bladder in the housing 2 to compensate for the expansion and contraction of the brake fluid.

Referring to FIG. 2, the system filling process is shown wherein brake fluid enters the cartridge body 4 from the brake line 14 through an inlet 15 formed at the end of the cartridge body 4. A threaded connector 52 is mounted on the threaded end 50 of the housing 4. A threaded cap 51 matingly engages the outer threaded end of connector 52. A seal 56 is provided on the inner end of connector 52 to seal the end of the brake line 14. A spring 62 is seated in the threaded end of the cartridge body 4.

The brake fluid flows through the timing port 11 carrying the system air with it and filling the bladder 3 with fluid. The air in the bladder 3 flows out through the open bleeder port 16. As this flow continues all air trapped in the system is exhausted out of the bleeder port 16. A slight flow restriction at the bleeder port 16 causes a slight fluid pressure rise which expands the dimples 54 in the bladder 3 outwardly. When the fluid source is shut off, the bleeder port 16 in the containment ring 8 is left open to allow the bladder 3 to relax into its original shape as shown in FIG. 3, exhausting a slight amount of fluid out through bleeder port 16. The bleeder screw 6 is closed and sealed by an O-ring 7 when the proper volumes of fluid and air are provided by the molded shape of the bladder.

Since the fluid system has no air in it, the bike can be bounced, laid on its side and turned upside down with no air ingestion problem or other negative effects that would be suffered by traditional reservoir type master cylinders or other so-called systems.

Figure 2A:
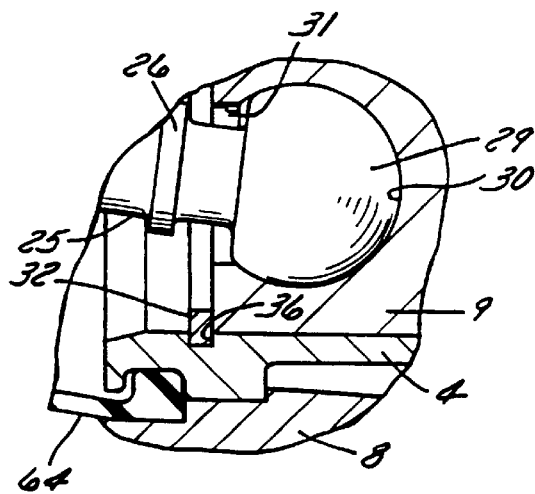
FIG. 2A is an enlarged view of the ball end and snap ring arrangement.

Referring to FIGS. 2 and 2A and particularly to the lever 23 which is pivotally connected to the housing 2 by means of pivot pin 24. In this regard a push rod 25 interconnects the lever 23 to the piston 9. A stop flange 26 is provided on the rod 25 and a slot 27 is formed on the outer end of the push rod 25. An adjustor bushing 28 is provided on the outer end of the push rod 25. A ball 29 is provided on the other end of the push rod 25 which is seated in a piston socket 30 as shown in FIG. 2A. Piston socket snap fit beams 31 are provided around the ball 29 and retained therein by the snap ring 32.

The lever position adjustment as shown in FIG. 2B is accomplished without affecting the critical clearance 33 between the primary seal at 10 and the timing port 11 as shown in FIG. 2B. The push rod 25 can be rotated by a screw driver aligned with slot 27 at the end of the rod 25. As the rod 25 is rotated the adjustor bushing 28 travels down the rod 25, moving the lever 23 with it. The most extreme adjustments are limited by flange 26 formed on the rod 25 in one direction and the screw slot 27 entering the adjustor bushing 28 in the other direction.

The lever 23 maintains its adjustment through a friction hold. The adjustor bushing's first thread is an interference thread to the rod 25. A boot 64 is tightly mounted on the rod 25 and the outer end of the cylindrical body 4 to enclose the open end of the cylindrical body 4.

The piston 9 is prevented from exiting the bore 35 by means of a snap ring 32 which is retained in a groove 36 in the end of the cartridge body 4. The rod 25 is kept from being loose in the piston 9 by the use of the resilient piston material whose snap joint beams 31 are sprung to interfere with the rod ball end 29 as shown in FIG. 2A. The rod ball end 29 is prevented from exiting the piston by the beams 31 that will not open wide enough to allow the rod ball end 29 to escape due to contact with the bore 35. Therefore, in the free state the rod 25 can be snapped into the piston 9. Removal of the rod ball end 29 is prevented by the restriction of movement the bore 30 provides.

Figure 4:
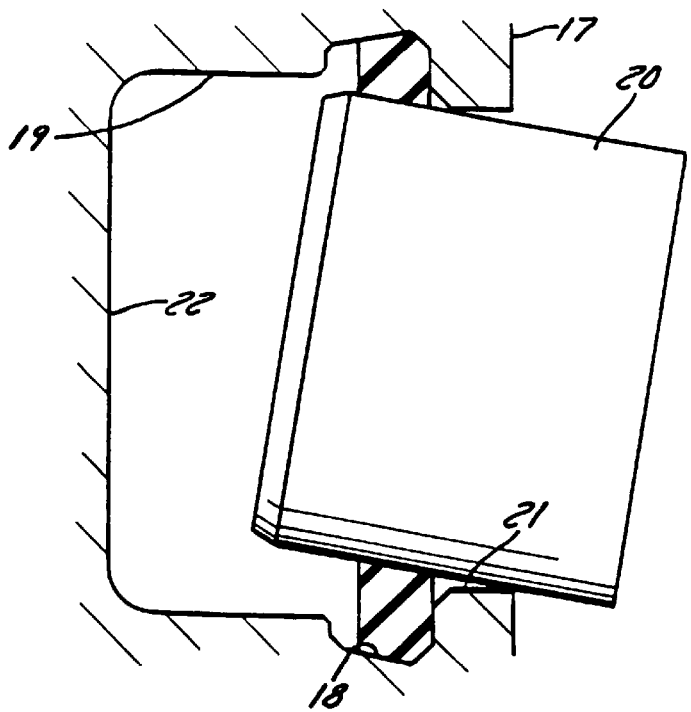
FIG. 4 is a view of a piston and an angular attitude to the caliper bore.
Figure 5:
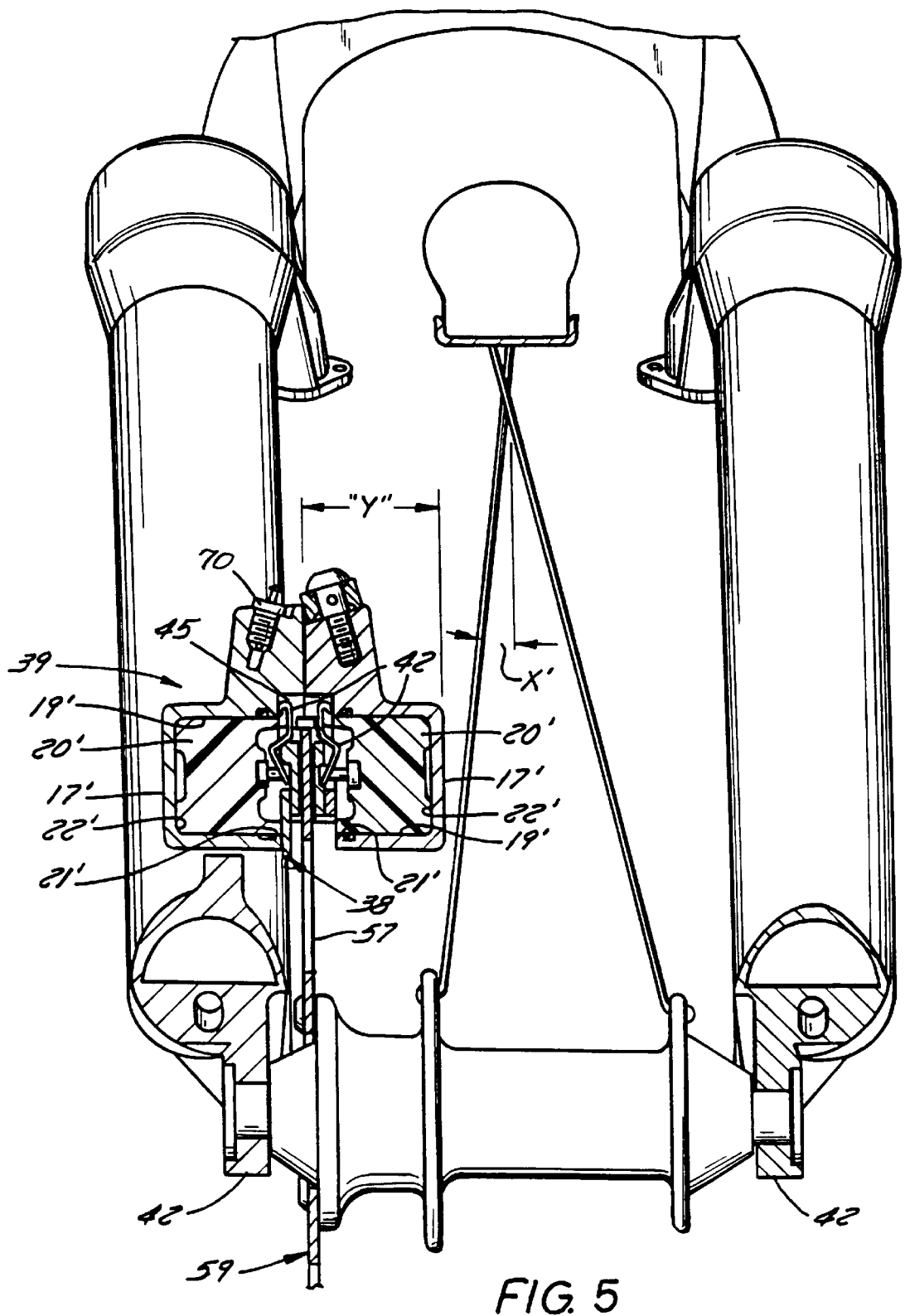
FIGS. 5 and 6 show the contrast in spoke angle achievable with standard pistons versus the ball joint piston to bore geometry.
Figure 6:
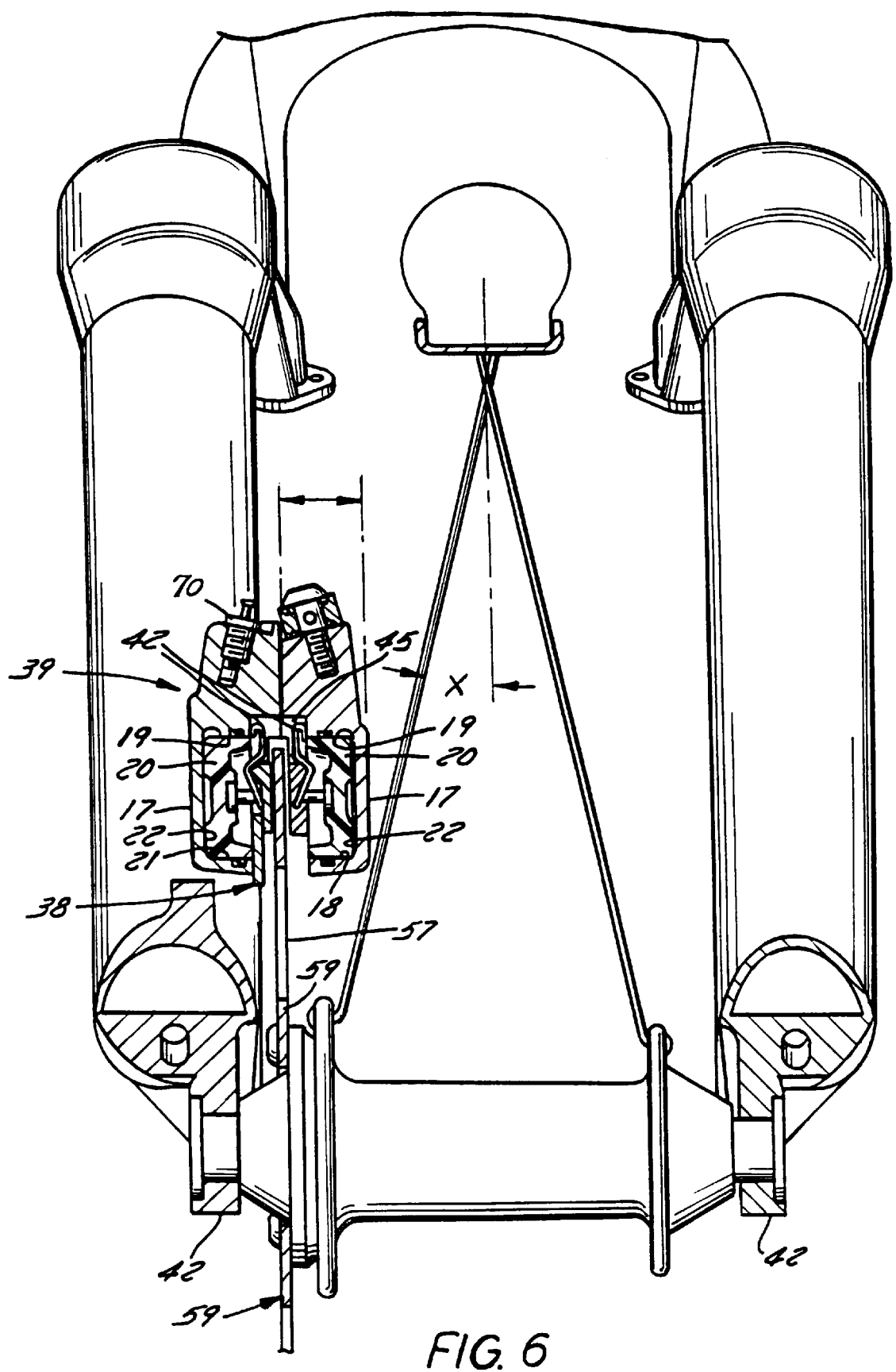

In FIGS. 4, 5 and 6 brake caliper housings 17 and 17' are shown having angularly machined seal grooves 18 and 18', an undercut bore 19 and a piston 20 in each bore 19. The engagement length of the pistons 20 to the bore land area 21 is made to be extremely short so as to allow the pistons to be angularly offset as shown in FIG. 4. This allows the pistons 20 to be designed with a length adequate only for sealing the piston 20 through the full cycle of a friction pad's wear as shown in FIG. 6 rather than needing a longer engagement as shown in FIG. 5 to resist jamming by sticking in the bore. This shortens the necessary bore depth 22 and allows for a greater spoke angle x of the wheel as shown in FIG. 6 than at the spoke angle x' of FIG. 5. This allows for a wheel with greater lateral strength which is important in rough riding. The piston and bore design also allows for smaller, lighter parts which is important for human powered vehicles.

Referring to FIGS. 7, 8 and 9, a friction pad and plate assembly 38 is shown which includes a backing plate 40 having a tab 46 for inserting and removing the assembly 38 from the piston 20. A friction pad 41 is formed on one side of the friction plate 40. A flexion spring 42 is mounted on the plate 40. The spring 42 includes a hook 50 on each end which snaps onto ears 51 on the plate 40. A U-shaped loop 55 is provided intermediate the ends of the spring 42 and an offset section 56 on each leg of the spring which is aligned with a groove 60 in the plate 40. In the installed condition the plates 40 are held snugly against the pistons 20 by the springs 42.

Figure 13:
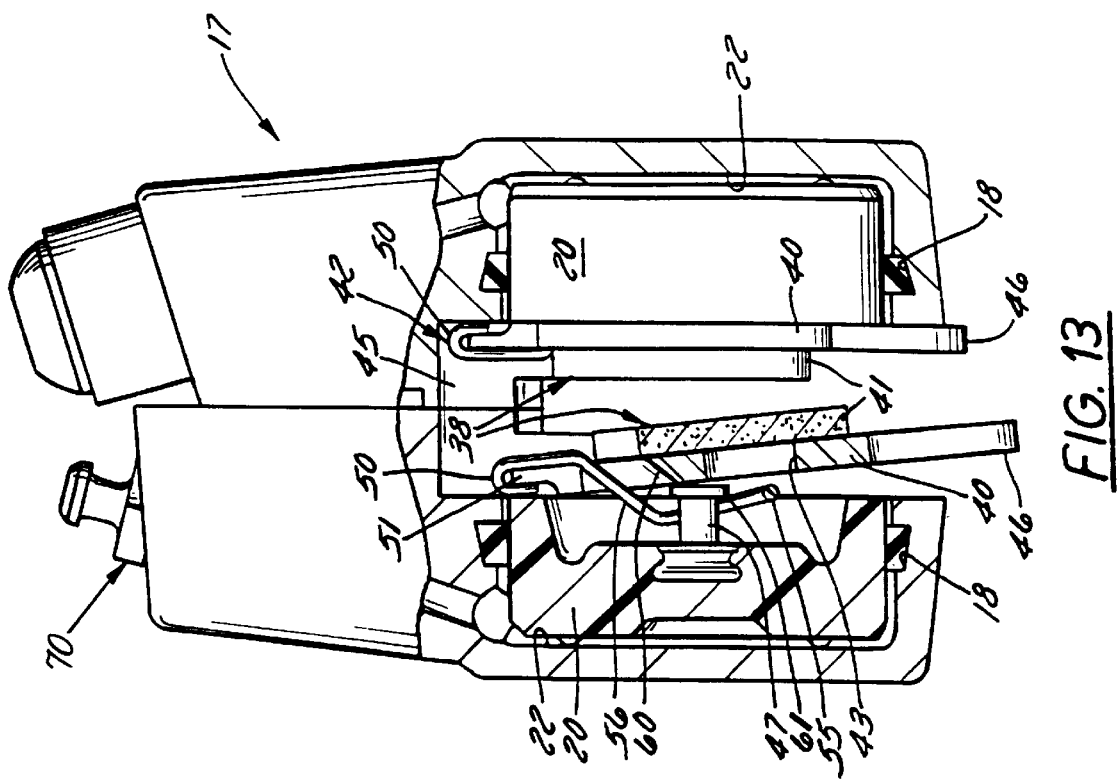
FIG. 13 shows the pad partially removed from the housing disk slot.

A piston post 47 is partially embedded in each of the pistons 20. A cap 61 is provided on the end of the post 47. The friction pad and plate assembly 38 is connected to the piston 20 by sliding the plate assembly 38 upward so that the U-shaped loop 55 engages the post 47 and is retained thereon by cap 61. A recess 43 is provided in the plate 40 which is aligned with the post 47 on the piston 20. The plate assembly 38 is positioned on the piston 20 by sliding the plate assembly 38 into the slot 45 with the U-shaped loop 55 aligned with the cap 61. The tab 46 is lifted as shown in FIG. 11. The spring 42 is deflected and the piston post 47 is clear of the friction pad plate hole edge 44. The friction pad and plate assembly 38 can be slid out of the bottom of the caliper housing as shown in FIG. 13. This is the only avenue of escape for the pad as the other three sides are closed.

Figure 12:
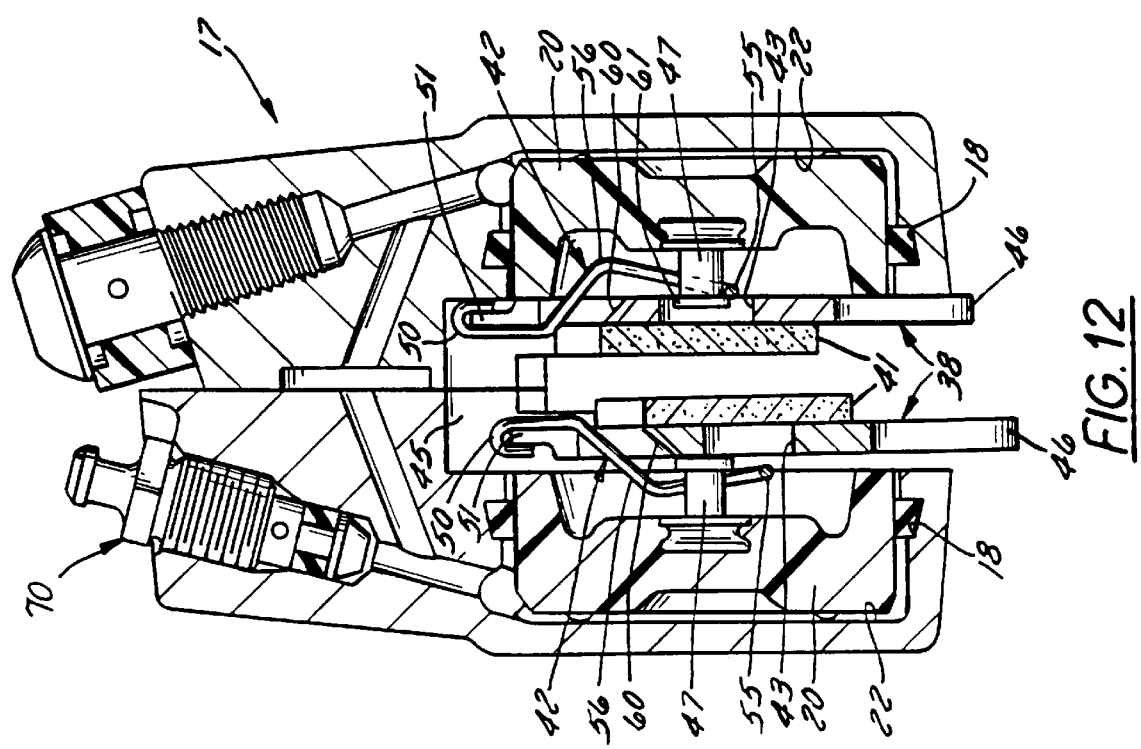
FIG. 12 shows the beveled top of the pad ramped over the piston post.

During insertion of the pads as shown in FIG. 12, the left side of the pad is slid up until the beveled section 56 of the pad 38, ramps over the piston post 47. The post 47 engages the spring 42, deflecting it away from the pad plate 40. The pad 38 continues sliding until the plate 46 snaps over the post 47. The pad is then pulled into contact with the piston face by spring 42 and the plate hole 43 captures the piston post 47. Once the wheel and disk assembly 39 are reinserted into the forks 42, the pads are trapped from lifting out of piston engagement and thus cannot escape.

Figure 14:
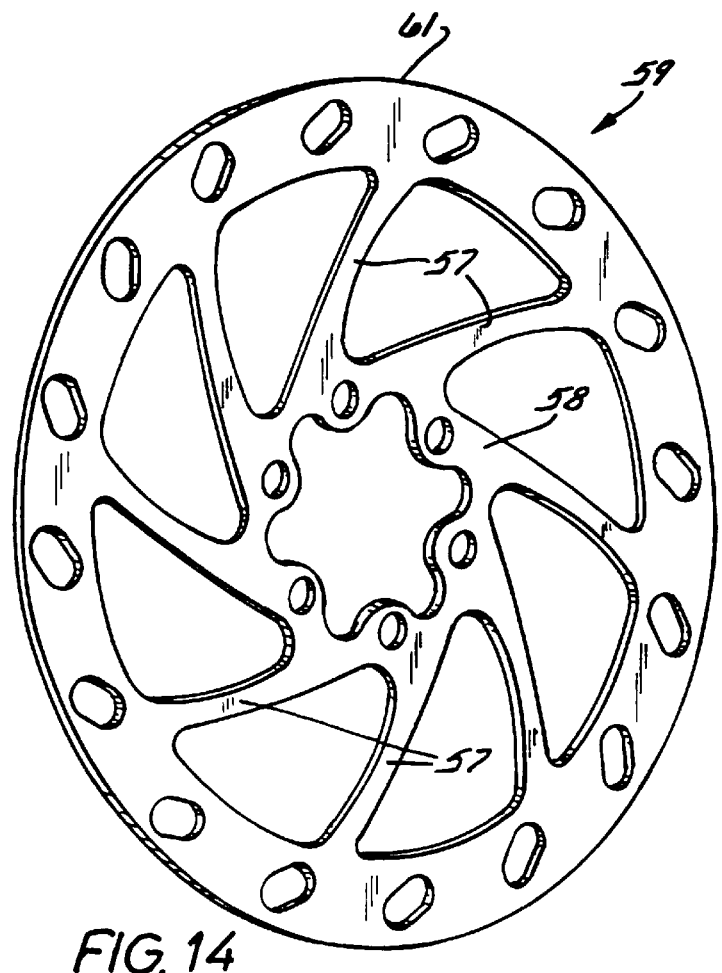
FIG. 14 shows the thermally compliant brake disk.

A thermally compliant lightweight brake disk 59, as shown in FIG. 14, is designed to prevent yielding which can cause warping or fracture under combined thermal and high torque loading. The friction contact ring 61 is supported by a number of curved legs 57 which are formed in the circular area 58. The legs 57 are shaped in such a way as to bend to comply with the outer ring's desire to expand when heated. This prevents high stress concentration on the legs 57 and avoids yielding. The legs 57 are also designed to be strong enough to withstand exceptionally high braking torque. Finally, the legs 57 are shaped to provide adequate axial bending but strength enough to prevent impact damage. It is important that the disk remains flat when not in use.

Figure 15:
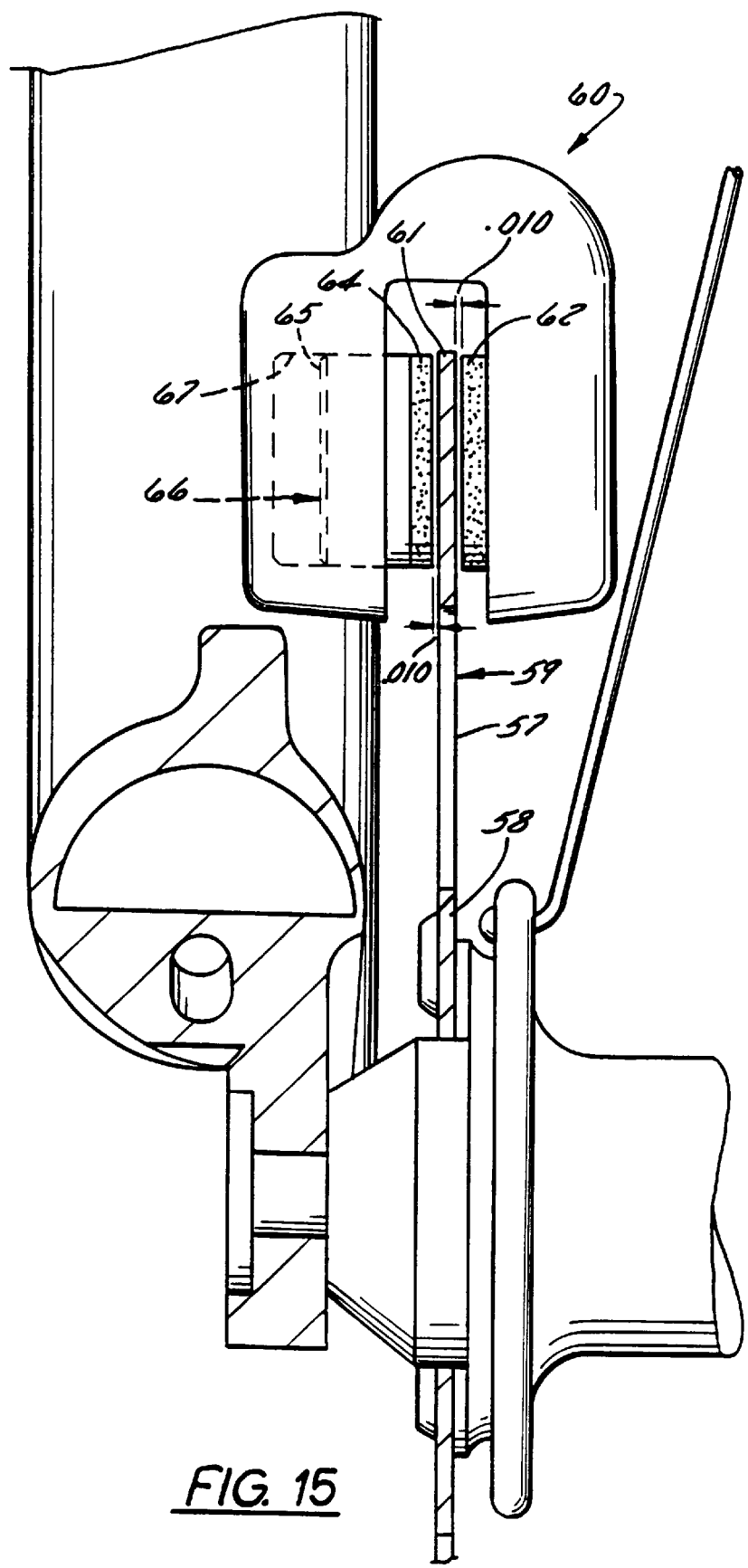
FIG. 15 is a cross section view of a fixed pad single acting caliper assembly.

Referring to FIG. 15 a fixed mount single acting caliper 60 is shown mounted on the bicycle frame in a position to straddle the lightweight brake disk 59. The caliper 60 is set up on the frame with a clearance of 0.010 inch between fixed pad 62 and the disk 59. The brake actuator 66 is positioned on the mount side with the moveable pad 64 positioned to engage the disk 59 after 0.010 movement. When the brake actuator 66 is applied, the moveable pad 64 closes the 0.010 gap, contacts the ring 61, flexes the ring 61 into contact with the fixed pad 62 and progressive frictional clamping occurs. Upon release of the moveable pad, the ring 61 returns to its home position with a clearance of 0.010 inch between the ring 61 and the pad 62 and between the ring 61 and the pad 64. With this arrangement, zero drag is provided on each side of the disk due to its flexibility and the resultant clearance.

Thus, it should be apparent that there has been provided in accordance with the present invention a bicycle brake system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A fixed mount single acting caliper mounted on a bicycle frame in a position to straddle a flexible brake disk,
   a fixed brake pad mounted on one side of the caliper;
   a moveable brake pad mounted on the other side of the caliper;
   a brake actuator piston on the moveable brake pad side of the brake disk in alignment with the outer periphery of the brake disk whereby the flexible brake disk is flexed into engagement with the fixed brake pad upon actuation of the brake actuator piston.

2. The caliper according to claim 1 wherein said brake disk is initially located 0.010 inches from both brake pads.

3. A brake system for a bicycle having a frame, the brake system comprising:
   a flexible brake disk;
   a fixed mount single acting caliper mounted on the bicycle frame in a position to straddle the flexible brake disk;
   a fixed brake pad mounted on one side of the caliper;
   a moveable brake pad mounted on the other side of the caliper; and
   a brake actuator on the moveable brake pad side of the brake disk in alignment with the flexible brake disk, wherein the flexible brake disk is flexed into engagement with the fixed brake pad upon actuation of the brake actuator.

4. The bicycle brake system of claim 3, wherein the brake disk includes an inner area fixed with respect to a rotatable wheel hub.

5. The bicycle brake system of claim 4, wherein the brake disk also includes an outer periphery, the caliper is mounted in a position to straddle the outer periphery of the brake disk, and the brake actuator is aligned with the outer periphery of the brake disk to flex the outer periphery into engagement with the fixed brake pad upon actuation of the brake actuator.

6. The bicycle brake system of claim 5, wherein the outer periphery of the brake disk comprises an outer friction contact ring and the brake disk further comprises a plurality of curved legs to support the outer friction contact ring.

7. The bicycle brake system of claim 6, wherein the curved legs are shaped to bend in compliance with expansion of the outer friction contact ring which occurs when the outer friction contact ring is heated.

8. The bicycle brake system of claim 7, wherein the brake disk is located with a first clearance between the fixed brake pad and the brake disk, and a second clearance between the moveable brake pad and the brake disk, when the brake actuator is not actuated such that the brake disk is disengaged from both pads.

9. The bicycle brake system of claim 8, wherein the moveable brake pad is moved into contact with the outer friction contact ring, and the outer friction contact ring is flexed into engagement with the fixed brake pad, upon actuation of the brake actuator such that frictional clamping occurs.

10. The bicycle brake system of claim 9, wherein the frictional clamping due to further actuation of the brake actuator is progressive.

11. The bicycle brake system of claim 10, wherein the brake actuator comprises a brake actuator piston.

12. A brake system for a bicycle having a frame, the brake system comprising:
    a flexible brake disk including an inner area, an outer periphery and a plurality of curved legs, the inner area being fixed with respect to a rotatable wheel hub, the outer periphery including an outer friction contact ring, the plurality of curved legs supporting the outer friction contact ring, wherein the curved legs are shaped to bend in compliance with expansion of the outer friction contact ring which occurs when the outer friction contact ring is heated;
    a fixed mount single acting caliper mounted on the bicycle frame in a position to straddle the outer periphery of the flexible brake disk;
    a fixed brake pad mounted on one side of the caliper;
    a moveable brake pad mounted on the other side of the caliper; and
    a brake actuator piston on the moveable brake pad side of the brake disk in alignment with the outer periphery of the flexible brake disk, wherein the brake disk is located with a first clearance between the fixed brake pad and the brake disk and a second clearance between the moveable brake pad and the brake disk when the brake actuator is not actuated, and wherein the moveable brake pad is moved into contact with the outer friction contact ring and the outer friction contact ring is flexed into engagement with the fixed brake pad upon actuation of the brake actuator piston.

* * * * *

UNITED STATES PATENT AND TRADEMARK OFFICE
CERTIFICATE OF CORRECTION

PATENT NO. : 5,950,772 Page 1 of 1
DATED : September 14, 1999
INVENTOR(S) : James A. Buckley, George H. Hinkens and Korey Johnson It is certified that error appears in the above-identified patent and that said Letters Patent is hereby corrected as shown below:

Column 5,
Line 46, replace "pistion" with -- piston --.
Line 14, delete "curved".

Column 6,
Line 16, delete "curved".
Line 19, replace "7" with -- 3 --.
Line 25, replace "8" with -- 6 --.
Line 34, replace "10" with -- 3 --.
Beginning at line 65, please add the following additional claims:

13. The caliper according to claim 1 wherein the frame includes a fork to which the fixed mount single acting caliper is mounted.

14. The caliper according to claim 1 wherein the fixed brake pad has a fixed position relative to the caliper during actuation of the piston.

15. The bicycle brake system of claim 3 wherein the fixed brake pad has a fixed position relative to the caliper during actuation of the actuator.

Signed and Sealed this

Thirtieth Day of July, 2002

*Attest:*

JAMES E. ROGAN
*Attesting Officer*     *Director of the United States Patent and Trademark Office*